United States Patent
Lechat et al.

(10) Patent No.: US 7,003,169 B1
(45) Date of Patent: Feb. 21, 2006

(54) VARIABLE TRANSFORMATION HIERARCHICAL IMAGE CODING

(75) Inventors: Patrick M. Lechat, Prades le Lez (FR); Nathalie Laurent-Chatenet, Rennes (FR)

(73) Assignees: France Telecom, Paris (FR); Telediffusion de France, Paris Cedex (FR)

( * ) Notice: Subject to any disclaimer, the term of this patent is extended or adjusted under 35 U.S.C. 154(b) by 0 days.

(21) Appl. No.: 09/980,108

(22) PCT Filed: May 22, 2000

(86) PCT No.: PCT/FR00/01402

§ 371 (c)(1), (2), (4) Date: Apr. 17, 2002

(87) PCT Pub. No.: WO00/74387

PCT Pub. Date: Dec. 7, 2000

(30) Foreign Application Priority Data

May 26, 1999 (FR) .................................... 99 06815

(51) Int. Cl.
*G06K 9/36* (2006.01)

(52) U.S. Cl. .................................... 382/240

(58) Field of Classification Search ................ 382/232, 382/233, 236, 240, 241, 243, 248, 250; 345/419, 345/423, 582, 586

See application file for complete search history.

(56) References Cited

U.S. PATENT DOCUMENTS

| | | | | |
|---|---|---|---|---|
| 5,654,771 A | * | 8/1997 | Tekalp et al. | 348/699 |
| 5,903,682 A | * | 5/1999 | Chun | 382/276 |

(Continued)

FOREIGN PATENT DOCUMENTS

| | | | |
|---|---|---|---|
| EP | 0 808 066 A2 | * | 11/1997 |
| WO | WO 98/27515 | * | 6/1998 |

OTHER PUBLICATIONS

Lechat et al., "Scalable Image Coding with Fine Granularity Based on Hierarchical Mesh", IS&T/SPIE Conf. on Visual Comm. and Image Processing, SPIE vol. 3653, Jan. 1999, pp. 1130-1142.*

(Continued)

*Primary Examiner*—Jose L. Couso
(74) *Attorney, Agent, or Firm*—Westman, Champlin & Kelly

(57) ABSTRACT

The invention relates to a method for coding an image that is to be coded, characterized in that said method comprises the following steps: definition of a hierarchical mesh structure having at least two levels of interconnected meshing formed from mesh units which are defined by peaks; determination, for each of said mesh units, of information concerning an error between the image which is to be coded and an interpolated image obtained from the peaks of the mesh units pertaining to the level of the meshing of the mesh unit in question; termination (33) of the refinement of mesh units having error information below a first predetermined threshold; implementation of a specific coding (35) for the mesh units having error information above a second predetermined threshold; continuation (34) of the refinement of mesh units having error information above the first predetermined threshold and below the second predetermined threshold.

19 Claims, 6 Drawing Sheets

U.S. PATENT DOCUMENTS

| | | | |
|---|---|---|---|
| 6,047,088 A | * | 4/2000 | van Beek et al. ............ 382/243 |
| 6,144,773 A | * | 11/2000 | Kolarov et al. ............. 382/240 |
| 6,738,520 B1 | * | 5/2004 | Acharya et al. ............ 382/232 |
| 6,795,070 B1 | * | 9/2004 | Laurent-Chatenet et al. ..... 345/423 |

OTHER PUBLICATIONS

Salembier et al., "Very Low Bit Rate Video Coding Using Active Triangular Mesh", IEEE, Jul. 1996, pp. 2060-2063.*

Yazdi et al., "Interframe Coding Using Deformable Triangles of Variable Size", IEEE, Oct. 1997, pp. 456-459.*

"Use of Two-Dimensional Deformable Mesh Structure for Video Coding, Part II—The Analysis Problem and a Region-Based Coder Employing an Active Mesh Representation", No. XP000641037 by Wang et al., IEEE Transactions on Circuits and Systems for Video Technology, vol. 6, No. 6, pp. 647-659, Dec. 1, 1996.

* cited by examiner

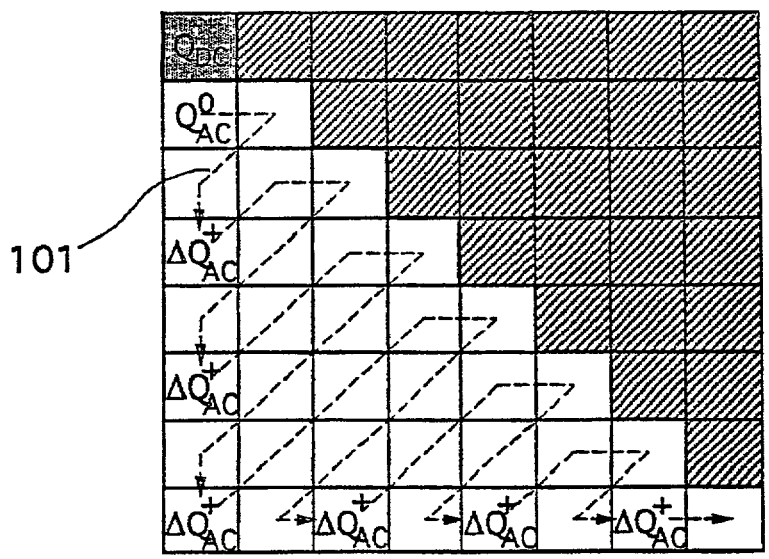
Fig. 10
Fig. 11
| 12 | 12 | | | | | | |
|----|----|----|----|----|----|----|----|
| 14 | 13 | 16 | | | | | |
| 14 | 17 | 22 | 29 | | | | |
| 18 | 22 | 37 | 56 | 68 | | | |
| 24 | 35 | 55 | 64 | 81 | 104 | | |
| 49 | 64 | 78 | 87 | 103 | 121 | 120 | |
| 72 | 92 | 95 | 98 | 112 | 100 | 103 | 99 |
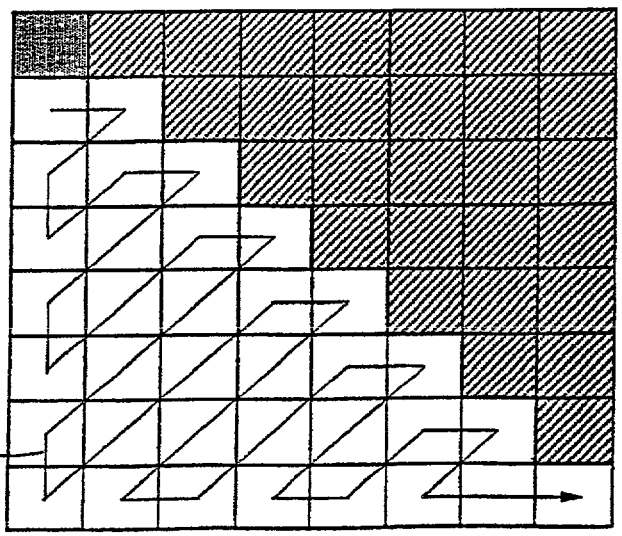
Fig. 12

VARIABLE TRANSFORMATION HIERARCHICAL IMAGE CODING

CROSS REFERENCE TO RELATED APPLICATION

This application is Section 371 application based on International Application Ser. No. PCT/FR00/01402 filed May 22, 2000, and published as WO 00/74387A1 on Dec. 7, 2000 not in English.

FIELD OF THE INVENTION

The field of the invention is that of the encoding of still or moving images. More specifically, the invention relates to image compression techniques or image sequence compression techniques based on the implementation of invertible mathematical transformations.

BACKGROUND OF THE INVENTION

There are very many known techniques of image compression to reduce the quantity of data needed to represent an image or a sequence of moving images. Thus, it is sought especially to reduce the bit rates of the digital signals in order to transmit them and/or to store them on a data carrier.

The invention can be applied especially but not exclusively to the transmission of image signals at low bit rates as well as to transmission without bit rate guarantee, as in the case of transmission made according to the IP ("Internet Protocol").

Among the many known image-encoding methods, it is possible to distinguish especially the ISO-JPEG and ISO-MPEG techniques which have given rise to a standard. These encoding techniques rely especially on the implementation of transformations, enabling the efficient elimination of redundancy in an image.

The main transformations used in image compression are:
the Karhunen Loéve transformation (KLT),
the discrete Fourier transformation (DFT),
the discrete cosine transformation (DCT),
and the Walsh-Hadamard transformation (WHT), To overcome these various drawbacks, another method has been proposed in the patent document FR-98 12525 filed on behalf of the same Applicant as in the present patent application, entitled "Procédé de codage d'images fixes ou animées avec réduction et adaptation du debit" "Method for the encoding of still or moving images with reduction and matching of the bit rate".

The object of this technique is a method for encoding a digital image designed to produce a bit stream representing this image, the length of the bit stream being a function of the desired representation. This method comprises the following steps:

the defining, in a field of the image to be encoded, of a hierarchical meshing comprising a plurality of nested meshings for which the peaks of the mesh units may be pixels of said image;
the achieving of optimization of luminance, chrominance, and positions on each meshing level;
the determining, for each mesh unit of said hierarchical meshing, of a difference in luminance between the image to be encoded and an interpolated image obtained from the peaks of the nested meshing to which the mesh unit considered belongs; and
the introducing, into the bit stream, of the values (advantageously encoded differentially with respect to the previous hierarchical level) of positions, luminance and chrominance of the peaks of the mesh units whose luminance difference is greater than a threshold difference.

It will be noted that this technique is not limited to the luminance and chrominance signals but can be applied to any model of colors. According to this technique, and as illustrated in FIG. 1, at the end of the meshing step, a quaternary tree structure 11 is built. This structure is associated with the hierarchical meshing 12 to manipulate the values (colors and positions) of the peaks of the mesh units. The tree has a number of nodes equal to the number of triangles in the corresponding meshing level. Each node 13 of the tree pertains to a single triangle 14 of the hierarchical meshing 12.

Once this tree 11 is built, a selection is made of the data of the tree to be introduced into the bit stream representing the image that will be transmitted and/or stored. This selection depends on the desired quantity.

To make this selection, for each triangle a difference in luminance between the image to be encoded and the interpolated image is calculated on the basis of the peaks of the nested meshing to which the considered mesh unit belongs. This difference is then compared with a threshold difference for each triangle. The value of the threshold difference is a function of the desired quality of representation.

Then, the part of the tree relating to the triangles whose difference in luminance is greater than the threshold difference is introduced into the bit stream. This process of selecting the nodes of the tree by taking an in-depth route is illustrated in FIG. 2. Only the nodes that are above the borderline 21 are preserved.

The threshold difference therefore enables the transmission of the data relating to the image as a function of the local quality of these different triangular partitions. Indeed, on a textured part, the transmission of the data takes place up to the last meshing level (the finest meshing) and, for the smoother parts, a rough level proves to be sufficient.

This technique is also described by Wang et al in the document "USE OF TWO-DIMENSIONAL DEFORMABLE MESH STRUCTURES FOR VIDEO CODING (XP000641037). This document proposes a method for the generation of a quadrangular hierarchical meshing. An error criterion is used to decide whether or not it is necessary to continue the hierarchical division for a given mesh unit.

To obtain adequate quality, when a portion of the image is highly textured, it is necessary to plan for a large number of levels. In this case, the efficiency of the hierarchical encoding is low. In other words, the hierarchical encoding is well suited to relatively simple images but not to the images having highly textured parts.

In practice, it is not rare for at least a part of the image to be highly textured. This aspect truly limits the practical value of the hierarchical encoding as described here above.

In particular, it is a goal of the invention to overcome these different drawbacks of the prior art.

More specifically, it is a goal of the invention to provide an image encoding method that makes use of the advantages of the technique herein known as hierarchical encoding, without showing any of its drawbacks.

In particular, it is a goal of the invention to provide an encoding method of this kind that is efficient even when the image to be processed has highly textured portions.

Another goal of the invention, naturally, is that the modifications made in the hierarchical encoding technique as described here above should not modify its efficiency when the image or image portion to be processed has low texturing.

It is also a goal of the invention to provide a method of this kind that is simple to implement and especially does not need any manual intervention (for example for the selection of the textured zones).

More generally, a goal of the invention is to provide an image encoding method with a good radio between the quantity of data to be transmitted and/or stored and quality of image reconstruction.

Another goal of the invention is to provide a corresponding decoding method that enables the reconstruction of images simply and at a low cost (in terms of processing time, storage capacity, etc.).

It is also a goal of the invention to provide a decoding method of this kind with high qualities of scalability (i.e. allowing a rough image to be swiftly reconstructed and then gradually refined up to the desired level of refinement).

SUMMARY OF THE INVENTION

These goals as well as others that shall appear more clearly hereinafter are achieved according to the invention by means of an image encoding method comprising the following steps:
   the definition of a hierarchical meshing having at least two nested meshings levels formed by mesh units defined by peaks (which may be pixels of said image to be encoded)
   the determining, for each of said mesh units, of a piece of error information between said image to be encoded and an interpolated image obtained from the peaks of the mesh units belonging to the meshing level of the mesh units considered;
   putting a stop to the refining of the mesh units having a piece of error information below a predetermined first threshold;
   the implementation of a specific encoding for the mesh units having a piece of error information above a second predetermined threshold;
   the continuation of the refining of the mesh units having a piece of error information above said first predetermined threshold and below said second predetermined threshold.

Thus according to the invention, two distinct encoding modes are used selectively. The hierarchical encoding or nested meshing encoding is the main encoding or the basic encoding, but it is not used systematically; for the image portions that require it, another more efficient encoding is used.

The decision to use this specific encoding is taken by comparison with a threshold. More specifically, three possibilities are offered at each node considered of the meshing: stopping the refining or the division of the mesh units (the quality attained for the corresponding image portion being sufficient), going to the next hierarchical level in preserving the same hierarchical encoding or using another encoding (in particular an encoding better suited to the highly textured portions).

According to a preferred embodiment of the invention, said specific encoding implements at least one reversible transformation (for example a DCT). Indeed, this technique proves to be well suited to the encoding of the textured portions.

Advantageously, said mesh units are triangles (obtained by a partitioning that is regular or adapted to the image contents). It will be noted that the use of a transformation such as a DCT on triangles is novel per se.

Thus, said specific encoding may advantageously comprise the following steps:
   the association, with each of said triangles to be encoded, of a square matrix representing said triangles to be encoded, by means of a first reversible transformation;
   the application of a second reversible decorrelation transformation to each of said square matrices delivering transformed matrices.

Preferably, said step of associating a square matrix comprises the following steps:
   the affine transformation of a source triangle into an isosceles rectangular triangle called a reference triangle;
   the creation of a square matrix whose lower part includes data representing said isosceles rectangular triangle;
   the symmetrizing of said square matrix Said second transformation may belong in particular to the group comprising:
   the Karhunen Loéve transformation (KLT)
   the discrete Fourier transformation (DFT),
   the discrete cosine transformation (DCT),
   and the Walsh-Hadamard transformation (WHT), According to a preferred embodiment, at least one of the following parameters can be modified:
   said first threshold;
   said second threshold;
   the structure of said nested meshing;
   a scale factor $\alpha$ enabling an expansion or compression of said square matrix in the space domain;
   the type of quantification;
   the quantification pitch.

Advantageously, said piece of error information corresponds to a difference in luminance, representing a squared error or an absolute error between a source triangle and the corresponding approximate triangle. For each mesh unit, advantageously the following choice is made:
   if said piece of error information is below said first threshold, the hierarchical division for the mesh unit considered is interrupted;
   if said piece of error information is above said first threshold, but below said second threshold, the application of said hierarchical division is continued;
   if said difference in luminance is above said second threshold, said specific encoding is implemented.

The adaptation to a signal component other than the chrominance is direct.

Preferably, for all the meshing levels other than the first level, the data taken into account for the encoding are quantified differential values, each corresponding to the quantified difference between an optimized value for the hierarchical level considered of the image to be encoded and a value interpolated from the meshing of the lower hierarchical level.

This greatly reduces the quantity of the information to be encoded.

Advantageously, the method of the invention comprises a preliminary step for optimizing the position of the peaks of each of said meshings, minimizing a predetermined error criterion.

In other words, the partitioning is adapted to the contents of the image.

Preferably, the method comprises a step for defining a quaternary subdivision tree used to identify the mesh units said specific encoding and the mesh units whose contents are interpolated from values at the nodes defining said mesh units.

Advantageously, it also planned to have a step for matching said mesh units with the contents of the image, implementing inversions of diagonals of the quadrilaterals formed by all the pairs of adjacent triangles.

The invention also relates to a method for the decoding of data encoded according to the encoding method described here above. A decoding method of this kind comprises especially the following steps:

the preliminary decoding of said data encoded according to said encoding, implementing a hierarchical meshing, enabling the description of an initial representation;

the complementary decoding of said data encoded by means of said specific encoding, enabling the refining of said initial representation.

Thus, the image can be reconstructed gradually, as and when reception and decoding takes place, in an increasingly refined way (first of all from successive hierarchical levels and then from complementary data of the specific encoding). It is therefore possible to match the quality of the reconstruction of the image to the available means (transmission bit rates and processing capacity of the terminal), and even to define several levels of decoding quality (it is possible for a simplified version to have no complementary decoding).

When said specific encoding implements a DCT applied to triangles, as described here above, said complementary decoding advantageously comprises the following steps of reconstruction:

the application of a inverse transformation to said second reversible transformation on said transformed matrices, delivering said reconstructed square matrices;

the association, with each of said reconstructed square matrices, of a corresponding reconstructed triangle by means of an inverse affine transformation of said first reversible transformation;

the reconstruction of said minimum partition from said reconstructed triangle.

Advantageously, said square matrices are recreated from data of a received bit stream, whose decoded data are the coefficients of the triangle to be reconstructed, which form the lower part of said matrix.

Preferably, said preliminary decoding provides for the reading, in the bit stream, of at least one of the pieces of information belonging to the group comprising:

the number of levels of the hierarchy;

the identification of the encoding technique used for each of the triangles;

the succession of the differential values of the components associated with the nodes of said hierarchical meshing the identification of the arcs on which a diagonal inversion is made.

BRIEF DESCRIPTION OF THE DRAWINGS

Other features and advantages of the invention shall appear more clearly from the following description of a preferred embodiment given by way of a simple illustrative and non-restrictive example, and the appended drawings, of which:

FIG. 1 shows the correspondence between a nested mesh and a quaternary tree;

FIG. 2 exemplifies selections of nodes of the tree of FIG. 1;

FIGS. 10 and 11 show two modes of quantification that can be used in the method of FIG. 7;

FIG. 12 illustrates the zigzag course of the encoding step of the method of FIG. 7;

DETAILED DESCRIPTION OF THE PREFERRED EMBODIMENTS

1. Basic Principles of the Invention

The invention therefore relates to an improvement of the technique of nested meshings (or hierarchical encoding techniques) as described in the introduction. According to the present invention, it is planned indeed, to use a second type of encoding for the parts of the image for which this technique of nested meshings proves to be inefficient.

As explained here above, a definition is made first of all, according to this nested meshing technique, of a hierarchical meshing in the filed of the image to be encoded comprising a plurality of nested meshings. The peaks of these meshes may be pixels of the image to be encoded. This meshing is for example obtained by regular and successive divisions of the meshes of the rough meshing. Advantageously, the position of the nodes defining the mesh units is adapted to the contents of the image.

The nested meshes technique takes position at a level n (between the first and last mesh level) of meshings, the interpolated image is computed by the hierarchical meshing technique and an error image corresponding to the difference in luminance between the original image and the interpolated image is deduced therefrom.

Then, the tree pertaining to the n first mesh levels is constructed and the luminance difference is computed for each of the triangles of the mesh of the error image and a threshold difference S is chosen. The criterion of the difference in luminance on a triangle T corresponds to the following mean quadratic error:

$$E_T = \sum_{x,y \in T} (I^{interp}(x, y) I^{orig}(x, y))^2 = \sum_{x,y \in T} I^2(x, y)$$

Where I is the error image between the interpolated image and the original image on the triangle T.

According to the present invention, for each node, it is determined whether the approximation procedure must be stopped, whether it is necessary to continue the subdivision of the meshing by refined interpolation with the hierarchical meshing technique or whether it is necessary to use another encoding technique which is advantageously a technique based on reversible transformation as described here below.

Figure 3:
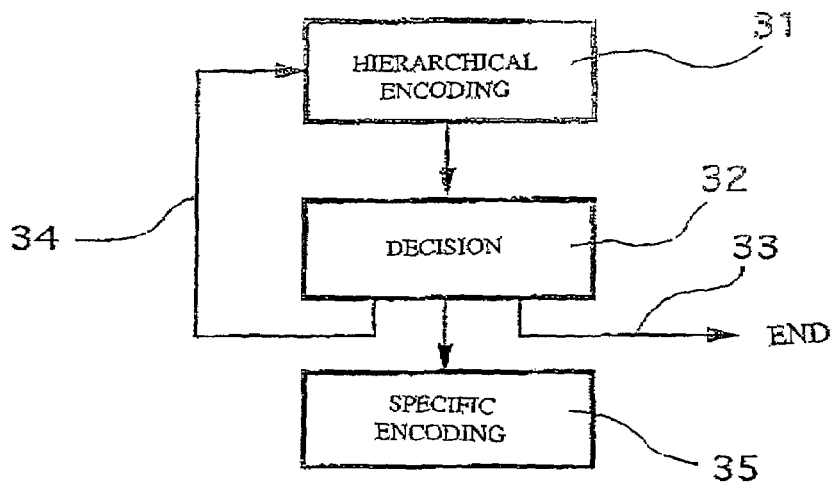
FIG. 3 is a flow chart showing the general principle of the method of the invention.

FIG. 3 illustrates the general operation of the invention. It starts with the hierarchical encoding 31 at the first level of the hierarchy. A particular example of implementation is described in detail here below (§2).

For each triangle considered, a decision 32 is taken for the rest of the procedure:
- interruption 33 of the encoding;
- passage 34 to the following hierarchical level;
- implementation of another type of encoding 35.

Paragraph 3 shows a mode of implementation of an encoding 35 using a DCT transform applied to triangles. Paragraph 4 gives a detailed view of an exemplary decision mechanism 32.

2. Reminders on the Nested Mesh Techniques

Figure 1A:
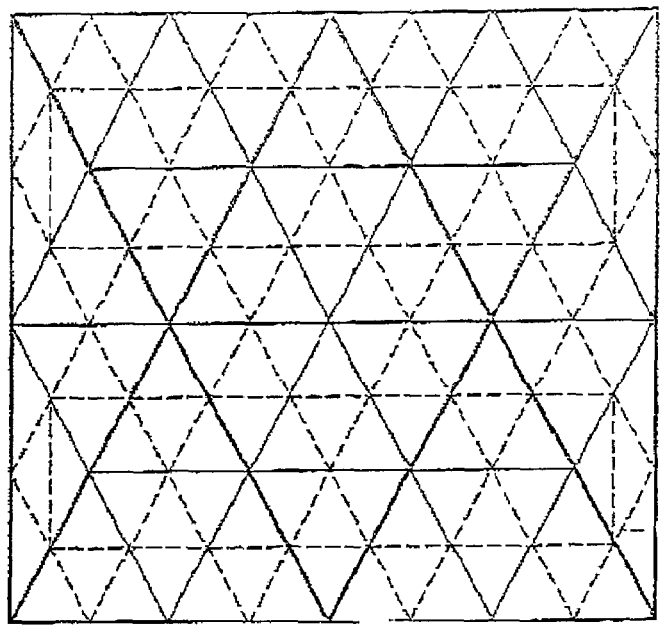
FIGS. 1 and 2 illustrate the general principle of the encoding method that is the object of a patent application FR-98 12525 discussed in the introduction. More precisely.
Figure 1B:
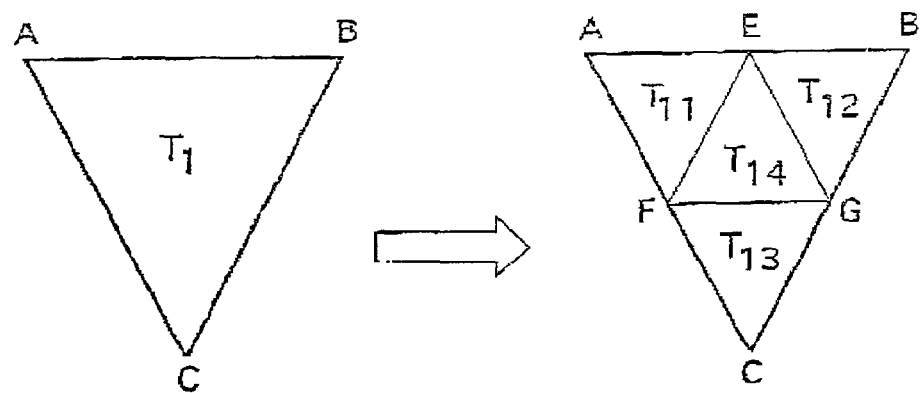
Figure 2:
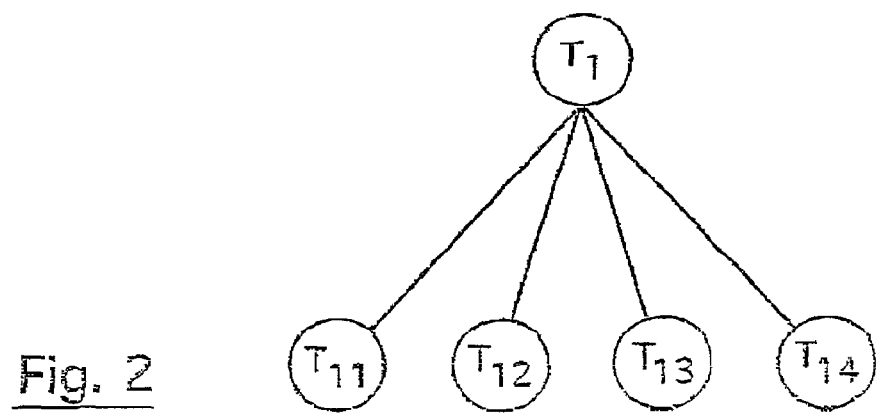

Here below, we shall specify certain advantageous aspects of the implementation of the step 32. The general principles of this technique have already been described in the introduction with reference to FIGS. 1 and 2.

2.1 Variable Threshold Difference

It is advantageously planned that the threshold difference will diminish during the method to provide for scalability of the encoding.

Thus, at each hierarchical level, the thresholding step is reiterated several times with increasingly small threshold differences so that, at each iteration, a group of additional bits is generated to improve the quality of the depiction.

To build a final bit stream without redundancy, provision is made for the use of a reference table in which each node of the tree is associated with a value 0 or 1 indicating whether the values of the node in question have already been introduced into the bit stream. The values of the table are updated as the values of the nodes are introduced into the bit stream. Thus, when the threshold difference diminishes, it is ascertained that the node values to be introduced into the bit stream have not already been introduced. This enables the introduction into the bit stream of only that part of the additional tree that corresponds to the lowering of the threshold difference.

It can thus be decided to use only the first part of the bit stream obtained with the highest threshold difference when there is not need for high representation quality. To obtain higher representation quality, it is necessary to use a greater part of the bit stream.

2.2 Quantification and Compression

It can also advantageously be planned to quantify and compress the values of the peaks before introducing them into the bit stream in order to limit the size of the stream. The quantification is chosen to be preferably non-uniform. It may for example rely on the statistical distribution of the luminance values (and chrominance and position values respectively).

At the end of the quantification step, the quantified differential values are subjected to a data compression operation designed to limit the length of the bit stream. Advantageously, the compression is done by an adaptive arithmetic encoder which has high compression rates in the present case.

The statistical distributions of the luminance, chrominance and positioning values being different from one another, it is preferable to encode these values separately. Thus, the adaptive arithmetic encoder is designed to process these different types of values separately.

2.3 Differential Encoding

In order to reduce the size of the bit stream, it is planned according to one improvement to introduce, into the bit stream, not the precise luminance, chrominance and position values of the peaks of mesh units of the nested meshing but differential values, except for the basic meshing. Each differential value represents the difference between the optimized value of the hierarchical level considered of the image to be encoded and an interpolated value obtained from exact values corresponding to the neighboring peaks of the nested meshing of the lower hierarchical level.

An exemplary determining of differential values is discussed in Appendix 1.

2.4 Meshing Adapted to the Contents of the Image

The structure of the meshing chosen here above is got by regular construction. It can therefore sometimes appear to be unsuitable for depicting an image that has disparities in its contents and that mixes, for example, uniform regions with more textured zones requiring a higher density of peaks. An optimizing of the position of the peaks of the meshing will shift the meshing peak concentrations towards the zones that require it.

According to a preferred embodiment, it is planned also to adapt the meshing (position and values Y, U, V of the peaks) to the contents of the image so as to exploit its encoding potential to the best possible extent. This adapting can be done at three levels:
- the optimizing of the position of the peaks of the meshing: the position of the nodes is modified as a function of their efficiency in representing the image locally;
- the optimizing of the luminance and chrominance values of the peaks of the meshing: the values Y, U, V are optimized to represent the original image to the best possible extent;
- the optimizing of the topology of the meshing: the topology of the meshing is modified by means of an operation of diagonal inversion so as to further improve the capacity of the meshing to represent the image locally.

The most immediate visual effect of such an optimization is that the peaks of the meshing come closer to the physical contours of the objects of the image. A technique of this kind is presented for example in the patent application FR-98 12525 filed on behalf of the Applicant of the present patent application.

Figure 5:
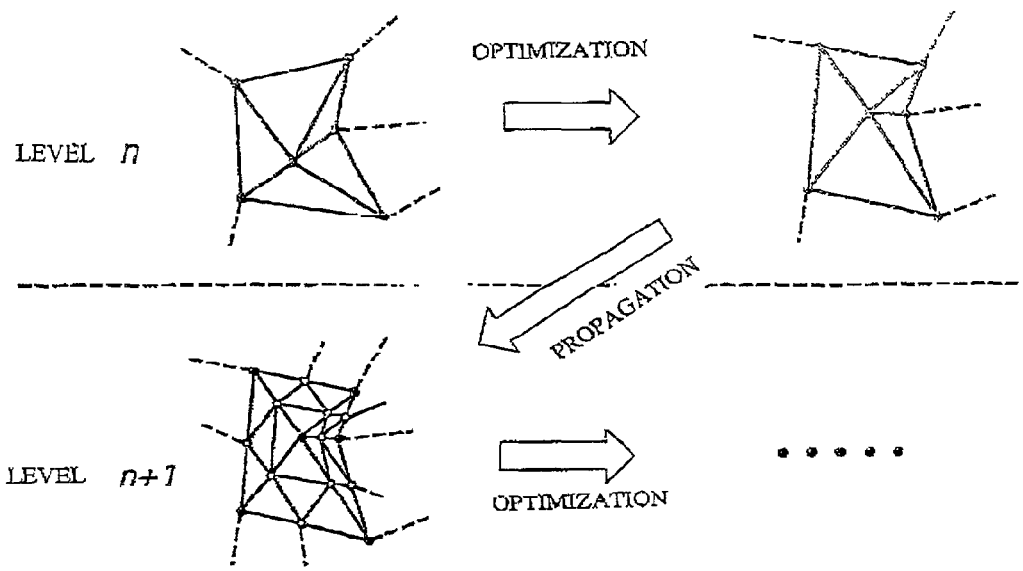
FIG. 5, which is commented on in Appendix 2, illustrates an operation for optimizing the positions of the peaks of a meshing level and its propagation at the higher meshing level.

This operation is done level by level, beginning with the level corresponding to the basic meshing (level 0). The result of the optimization at the level n is then transmitted to the level n+1 and the position of the additional peaks of the level n+1 is obtained from the new position of the level n peaks. This optimizing of the position at each level and its propagation to the different levels of the tree are illustrated in FIG. 5 and discussed in Appendix 2.

2.5 Diagonal Inversion

According to a final improvement, it is also possible to plan for improving the typology of the meshing. Indeed, it happens that the local structure of the meshing is not suited to particular features of the image. Although it would be possible to refine the meshing until an adapted hierarchical meshing is obtained, it sometimes proves to be simpler to carry out a diagonal inversion operation.

This diagonal inversion operation is done on the last mesh level and consists in inverting the diagonal in the convex quadrilaterals formed by two adjacent triangles of said meshing level if the meshing thus modified provides better quality of image reconstruction.

Figure 6A:
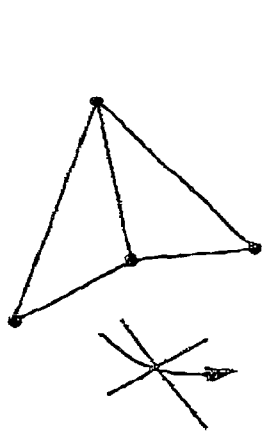
FIGS. 6A and 6B commented upon in Appendix 3 respectively show a case where the diagonal inversion is excluded and a case where it is possible.
Figure 6B:
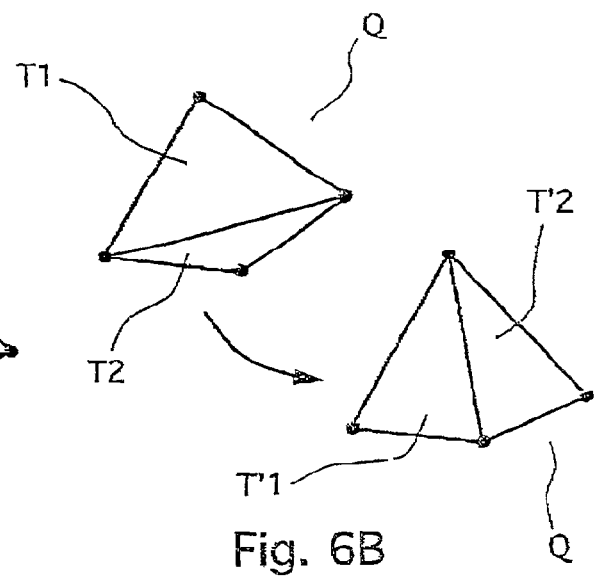

This operation of diagonal reversal is presented in Appendix 3 with reference to FIGS. 6A and 6B.

2.6.1 Problem of Highly Structured Zones

Despite these different improvements, it is observed that this technique is not sufficiently effective in processing certain image portions, especially when they are highly textured.

3. DCT Encoding Adapted to a Triangular Partition

The invention therefore proposes the implementation of a transformation, for example a DCT transformation, adapted to a triangular partition for the image portions that require it. The choice of these portions is discussed in paragraph 4.

3.1 Principle

Figure 7:
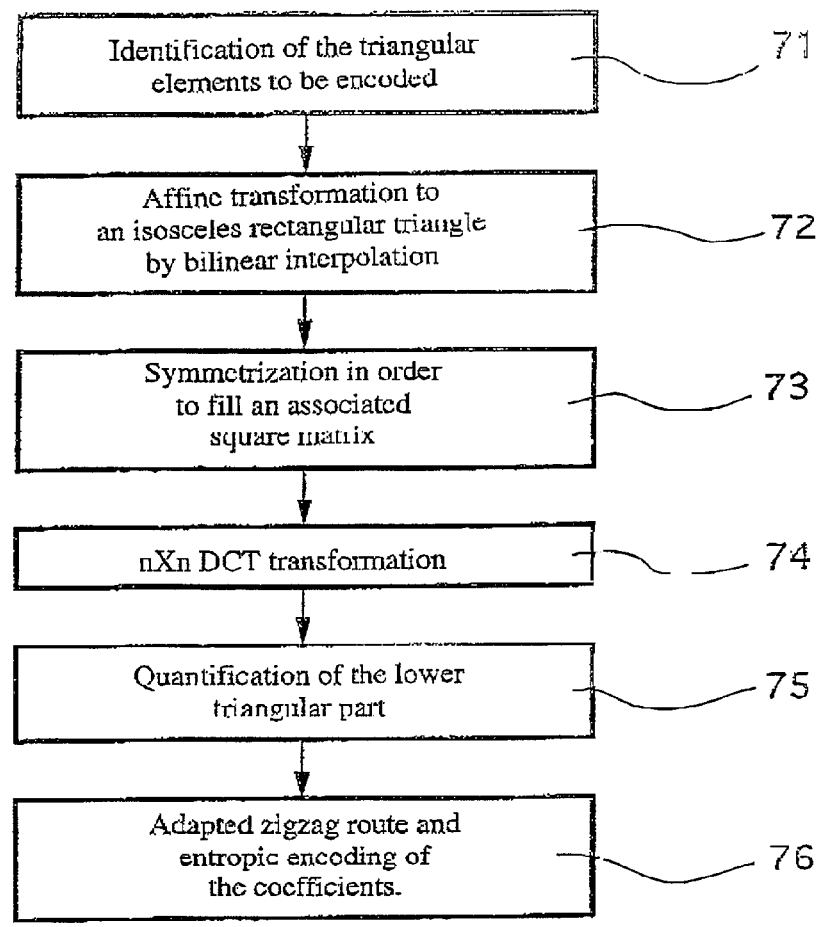
FIG. 7 is a simplified flow chart of a mode of implementing the specific encoding according to the invention, relying on implementation of a DCT.

FIG. 7 is a general flow chart illustrating the corresponding method.

The processing with node according to the invention is therefore the following:
- definition 71, on the field of the image to be encoded, of a triangular partition which may be adapted to the contents on the field of the image portion to be encoded;
- the determining for each element of the partition obtained of the transformations used to associate a reference triangle (72) and then a square (namely a matrix) with each triangular embodiment (73);
- the performance of a DCT 74 on each of these matrices;
- the application of a quantification method 75 and encoding method 76 that may be identical with those of current standards.

The partitioning 71 may of course be adapted to the contents of the image for example by implementing the operations described in paragraph 2.4.

3.2 Reversible Transformations

3.2.1 Affine Transformation in an Isosceles Triangle

Figure 8:
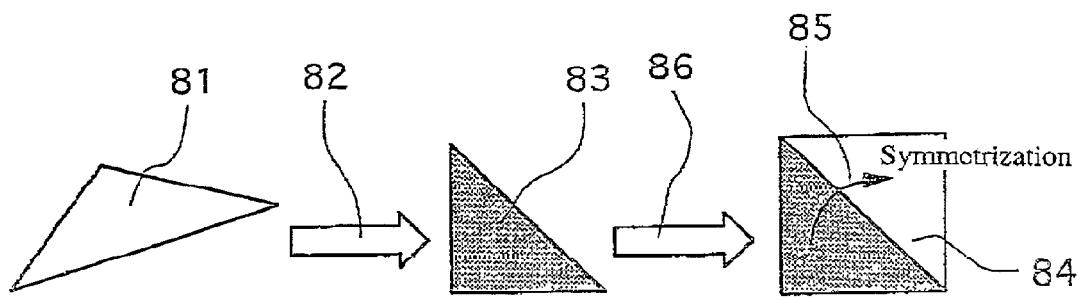
FIG. 8 illustrates the principle of the second and third steps of the method of FIG. 7.

The second and third steps 72 and 73 of the method of the invention are illustrated in FIG. 8.

For each triangular element 81 of the partition, the operation determines the affine transformation 82 used for the association with each unspecified triangle 81 of a reference triangle 83 which is an isosceles triangle. The reference triangle is then converted into a square and more precisely a square matrix 84 by symmetrization 85.

Figure 9:
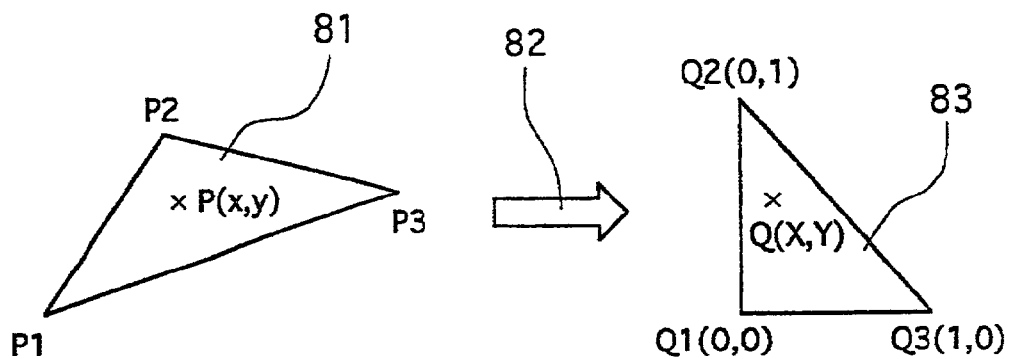
FIG. 9 is a more precise extract of FIG. 9.

More precisely, the first transformation 82 is used to determine the affine transformation by which it is possible to pass from any triangle 81 to the reference triangle 83 as shown in FIG. 9.

The invertible affine transformation F such that $P_i = F(Q_i)$ with $P_i = (x_i, y_i)$ and $Q_i = (X_i, Y_i)$ is written as follows:

$$\begin{cases} x = x_1 + (x_3 - x_1)X + (x_2 - x_1)Y \\ y = y_1 + (y_3 - y_1)X + (y_2 - y_1)Y \end{cases}$$

This affine transformation is invertible because the determinant of the matrix is equal (apart from the sign) to 2A (where A represents the area of the unspecified triangle 81), which is assumed to be non-zero. This inverse affine transformation is therefore written as follows:

$$\begin{cases} X = \dfrac{(x_2 - x_1)(y_1 - y) + (y_1 - y_2)(x_1 - x)}{(x_3 - x_1)(y_2 - y_1) + (x_2 - x_1)(y_1 - y_3)} \\ Y = \dfrac{(y_3 - y_1)(x_1 - x) + (x_1 - x_3)(y_1 - y)}{(x_3 - x_1)(y_2 - y_1) + (x_2 - x_1)(y_1 - y_3)} \end{cases}$$

3.2.2 DCT

If $I(x,y)$ is the luminance of the pixel having coordinates $(x,y)$ and if it is assumed that the image to be encoded has been partitioned into M×N sized blocks, the application of a block-oriented transformation $a(x, y, m, n)$ will produce an image F with:

$$F(m, n) = \sum_{x=0}^{M-1} \sum_{y=0}^{N-1} I(x, y) a(x, y, m, n) \quad (1)$$

for $I(x,y) = (x,y)$ owing to the symmetrization 85.

Starting with the transformation $a(x, y, m, n)$, a reverse transformation $b(x, y, m, n)$ can be defined in order to reconstruct the original image I:

$$I(x, y) = \sum_{x=0}^{M-1} \sum_{y=0}^{N-1} F(m, n) b(x, y, m, n) \quad (2)$$

The DCT is obtained by assuming:

$$a(x, y, m, n) = \frac{2c(m)c(n)}{\sqrt{MN}} \cos\left(\frac{(2x+1)\pi m}{2M}\right) \cos\left(\frac{(2y+1)\pi n}{2N}\right) \quad (3)$$

With:

$$c(w) = \begin{cases} \dfrac{1}{f} & \text{if } w = 0 \\ 1 & \text{else} \end{cases}$$

The second transformation 73, 86 consists of the transposition of the information contained in each triangle with an area A in the lower part of a square matrix G of $E(\alpha \times \sqrt{2 \times A})$ lines where E represents the higher integer part of the value between parentheses and $\alpha \in R^+$, * represents a scale factor that acts on the visual depiction of the image, in obtaining an expansion ($\alpha > 1$) or a compression ($\alpha < 1$) in the space domain.

According to the formulae (1) and (3) we have:

$F(m,n) = F(n,m)$

After the symmetrization of G, its transformation 74 according to the equation (1) generates a matrix that is also symmetrical H.

Consequently, the information contained in the lower part of each matrix G being identical to the upper part 75, the use of the block-based DCT transformation 74 may be implemented, for example by MPEG or JPEG techniques.

After the transformation 74, only the lower parts of the matrices H will be quantified 75 and encoded 76.

3.3 Optimization of the Encoding

In order to optimize the performance characteristics in terms of the cost of encoding 76, two action means can be implemented, modulate for example as a function of the relevance of the texture underlying the triangles considered. These are:
- the scale factor $\alpha$ (then $\alpha < 1$ is taken);
- the choice of the quantification and especially the amplitude of the quantification pitch chosen.

3.3.1 Quantification

Among the quantifications 75 possible, we can use particularly:

- a uniform quantification;
- a quantification with a zigzag route;
- a quantification by use of a weighting matrix pre-assessed on a psycho-visual criterion.

The quantification with a zigzag route consists in initializing the quantification process at a value $Q^0_{AC}$, which, during the route, at each trace-back, is incremented by a value $\Delta_{AC}$, as illustrated by the arrow 101 of FIG. 10.

An exemplary weighting matrix pre-assessed on a psycho-visual criterion is the JPEG standard QM matrix illustrated in FIG. 11 or MPEG4. The matrices G and QM maybe of different sizes. An interpolation will be made of the matrix QM bringing this matrix to the size of G as for JPEG and it is then possible to define a quality factor qt acting as a multiplier of the matrix QM.

3.3.2 Encoding

The effective encoding 76 is achieved for example by performing an RLE (Run Length Encode) and entropic type of encoding on a zigzag route 121 shown in FIG. 12.

4. Combination of the Two Encoding Techniques

Figure 13:
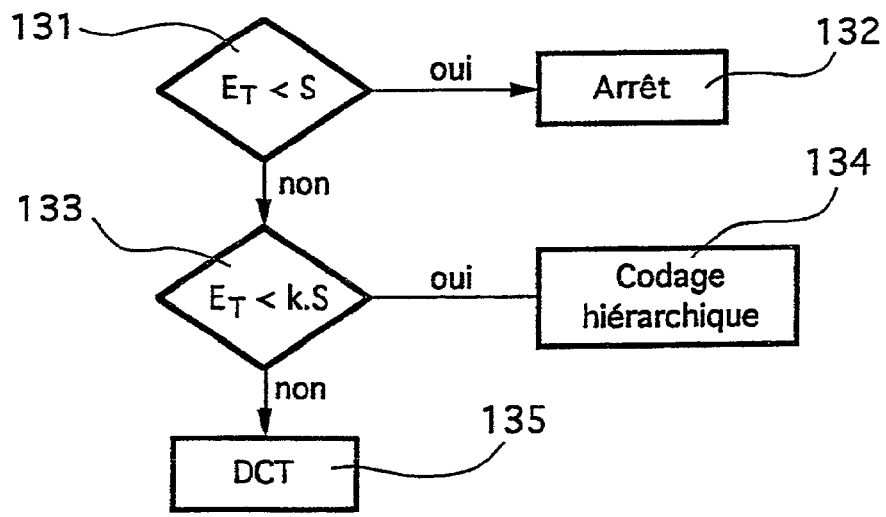
FIG. 13 is a simplified flow chart illustrating the choice of the processing to be made when the method of the invention and a hierarchical encoding are implemented in an associated way.

The implementation according to the invention of the two encoding techniques described here above may rely on the method shown in FIG. 13. If, for the given level n, the difference in luminance on a triangle T of the mesh is:

- 131: below a threshold difference: the part of the image interpolated on this triangle has good visual quality and the procedure is stopped (132);
- 133: higher than the threshold difference but below k×S with k≧1: the method of continuous approximation with the hierarchical mesh technique (134), the part of the interpolated image corresponding to an image with average texturing;
- 135: greater than k×S with k≧1: the triangle is processed by a DCT applied to the triangle of the error image (136).

This selection is justified as follows. It is known that:

$$|F(m, n)| \leq \sum_{x=0}^{M-1}\sum_{y=0}^{N-1} |I(x, y)a(x, y, m, n)| \quad (1)$$

whence:

$$|F(m, n)| \leq 2 \times \sum_{x=0}^{M-1}\sum_{y=0}^{N-1} |I(x, y)|$$

therefore:

$$\exists\, l \geq \frac{1}{\mathrm{Min}_{x,y}|I(x, y)|},$$

$$|F(m, n)| \leq 2 \times l \times \sum_{x=0}^{M-1}\sum_{y=0}^{N-1} I^2(x, y)$$

It is therefore seen that the coefficient F(m, n) tends towards zero when the luminance difference tends towards zero. A low quadratic error leads to coefficients AC after low amplitude transform having high changes of being cancelled after quantification.

Thus, it proves to be more judicious to carry out an affine interpolation, which is less costly than a DCT transformation, on such mesh units.

The overall method therefore consists in processing a part of the image by the hierarchical meshing technique and in processing the highly textured parts of this image by a DCT according to the present invention applied to triangles of the corresponding error image.

Here therefore, on the textured part of the error image, a DCT is applied to the triangles for which the luminance difference is great.

It must be noted that the transformation-based technique is only an example. The invention can use many other complementary encoding techniques, such as for example:

- methods based on fractal decomposition: the principle of image compression in gray levels by the IFS method, also called fractal compression, relies on the expression of the contents of the image by means of the contents themselves.

It can be seen as a self-quantification of the image. The formalizing of this method arises especially out of the work of Hutchinson in 1981 and the work of Bradley, Demoko and other research workers at the Georgia Institute of Technology between 1985 and 1988. The first automatic algorithm applying these ideas to image compression was proposed by Jacquin in 1989.

Improvements in this technique are proposed in the patent application FR-99 00656 entitled "Procédé et dispositif de codage á base de schémas IFS, á fonctions de collage oscillantes, procédé de codage, fonction de collage, support de connées et applications correspondants" (Encoding method and device based on IFS schemes, with oscillating collage functions, encoding method, collage function, data medium and corresponding applications);

- methods known as "matching pursuit" methods described for example in the article by Ralph Neff and Avideh Zakhor, "Very Low Bit Rate Video Coding based on Matching Pursuits", published in IEEE Transactions on Circuits and Systems for Video Technology. The encoding (of the residue) by matching pursuit is an iterative method that uses a dictionary of redundant functions. At each iteration, a search is made for the function that best represents the residue obtained in the previous step. Thus, the image is broken down on a sequence of atoms that represents it optimally;

- the SADCT (Shape Adaptive DCT) described for example by T. Sikora and B. Makai in "Shape Adaptive DCT for Generic Coding" (IEEE Transactions on Circuits and Systems for Video Technology, 5 (1), pp. 59–62, February 1995).

It can also be planned that several of these techniques will be available, the selection of one of these techniques during the decision step taking place as a function of predetermined criteria.

5. Decoding

The invention also relates to the decoding of data encoded according to the encoding method described here above. This encoding method is deduced directly from the encoding steps.

Thus, the encoding relies on the reception of a bit stream containing:
- the description of an initial depiction of the image coming from the preliminary encoding (which will be subjected to a symmetrical preliminary decoding);
- the values quantified and encoded after DCT transformation associated with the selected triangles.

The weighting coefficients of the matrices may be transmitted in the bit stream. However, preferably, they are known to the decoder.

The decoding of the values quantified and encoded after DCT transformation comprises especially the following steps:
- the creation of a symmetrical square matrix whose lower part includes the decoded coefficients of the triangles to be shown, read in the bit stream;
- reverse DCT transformation of the matrix thus created;
- affine transformation of the isosceles rectangular triangle associated with the lower part of the matrix towards the triangle to be represented.

The corresponding decoding especially provides for the reading in the bit stream received:
- of the number of levels of the hierarchy;
- the identification of the encoding technique used for each of the triangles;
- the succession of the differential values of the components associated with the nodes of said hierarchical meshing;
- the identification of the arcs on which a diagonal inversion is performed.

APPENDIX 1

Figure 4:
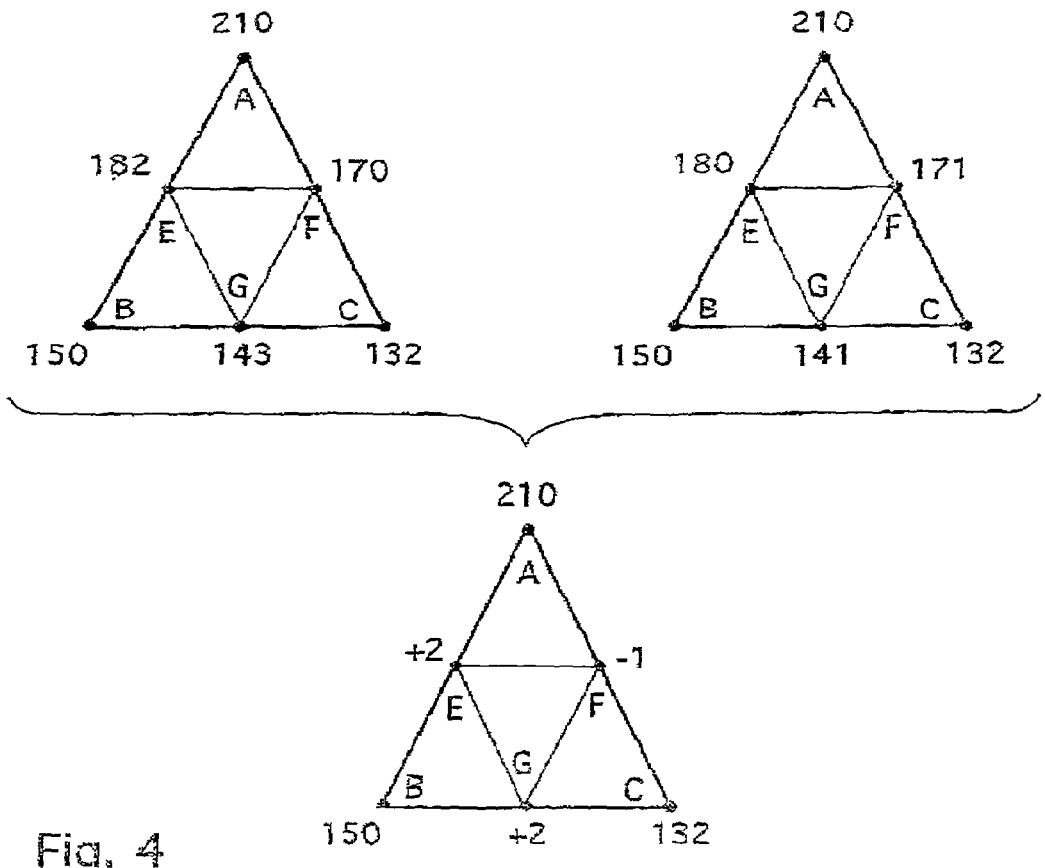
FIG. 4 referred to in Appendix 1 illustrates the determining of the differential values to be introduce into the bit stream after quantification, which will be transmitted or stored when the hierarchical encoding is implemented.

An example of the determining of differential values is shown in FIG. 4. The figure considers a level 0 triangle whose vertices A, B, C respectively have luminance values 210, 150 and 132. This triangle is subdivided into four identical level 1 triangles, thus giving rise to three new vertices E, F and G, located respectively at the midpoints of the sides AB, AC, and BC of the level 0 triangle. The luminance values of the vertices E, F and G, in the image to be encoded are respectively 182, 170 and 143. If the luminance values of the vertices E, F, G are computed by interpolation of the values of the adjacent vertices, the values 180, 171 and 141 are obtained. The values introduced into the bit stream are then +2 −1 and +2 corresponding to the difference between the exact values and the interpolated values. These values are, however, subjected to preliminary quantification to limit the number of possible values and thus improve the performance characteristics of the data compression operation to follow.

Furthermore, so as not to accumulate quantification errors, the differential values are computed from the quantified values of the lower level.

APPENDIX 2

The position is optimized by minimizing a criterion E, corresponding to the luminance divergence between the image to be encoded and the interpolated image. To compute E, we consider points q and $R^3$ having coordinates x, y and z with z=Y (luminance component). The criterion E, is defined as follows:

$$E = \sim_R F(q) dq$$

where F, is an indicator function equal to 1 if q is included between the surface formed by the points q of the original image and the surface formed by the points q of the interpolated image, and is zero if not.

The divergence E, is minimized by means of an adaptive pitch gradient descent algorithm. What has to be done in fact is to find the vector X of the points of $R^3$ where E is minimal, namely:

$$\nabla E(X) = 0$$

This amounts to resolving the following system of non-linear equations:

$$\begin{cases} \frac{\partial W}{\partial x}(X=0 \\ \frac{\partial E}{\partial x}(X=0)^3 \\ \frac{\partial E}{\partial x}(X) = 0 \end{cases}$$

This system can be resolved directly by Newton's method. However, it can happen that this method does not converge when the starting point of the iterations is far too removed from the solution. It is therefore preferable to use iterative procedures leading to the production of a series of intermediate positions $q_1, q_2 \ldots$ converging towards a local optimum of E.

This type of iterative procedure runs as follows: the operation to determine the optimum position of the peak $S_0$ starts from its initial position $q_{s0}$, and the gradient of E at this point is computed. Since $I^{\nabla E} q_{S0}$ indicates the direction of the greatest increase in E, the peak is shifted by a quantity $\alpha_0$ in the opposite direction, and the peak $S_0$ has the following as a new position:

$$q_1 = q_{S_0} - \alpha_{0*} \frac{\nabla E q_{S_0})}{|\nabla E q_{S_0})|}$$

The procedure thus repeated gives rise to the intermediate positions $q_1, q_2 \ldots q_k$, such that:

$$q_{k+1} = q_k - \alpha_{k*} \frac{\nabla E q_k)}{|\nabla E q_k)|}$$

Advantageously, an adaptive pitch $\alpha_k$ is chosen so as to accelerate the convergence. The adaptive pitch gradient descent method consists in diminishing (or respectively increasing) the pitch $\alpha_k$ when the divergence E increases (or decreases respectively) while complying with a size constraint on the pitch aimed at obtaining $\alpha_k \in [\alpha_{min}, \alpha_{max}]$. The final position $q_n = q_{S0}$ is obtained when the difference between the two successive divergence values E is smaller than a minimal threshold divergence. The optimum position of the other peaks of the meshing are computed similarly.

As seen here above, the divergence E, is computed with respect to the real image. According to an improved version, the divergence E, is computed at each meshing level with respect to a specific reference image T having similarities in terms of frequency content with the meshing level considered. Thus, the basic meshing (level 0) represents only the low-frequency aspect of an image, the reference image used to optimize the position of the peaks of this meshing level also has a low-frequency frequency content. This reference image is obtained by the filtering of the real image.

Similarly, with each meshing level, a reference image is associated. The frequency content of this reference image is adapted to the meshing considered. The reference image associated with the highest meshing level corresponds to the real image (without filtering). To generate these reference images, an approximation of the infinite pulse response half-band low-pass filter is used.

$$h(n) \frac{\sin e(\pi n/L)}{\pi n/L}$$

L being a sub-sampling factor.

Thus, a different reference image is used at each meshing level to compute the value E.

The optimizing of the luminance values and chrominance values associated with the meshing peaks constitutes another possible improvement of the method of the invention.

The optimizing of the values Y, U, V is done through a least error squares method and consists in minimizing a criterion E' defined in the field of the images $\Omega$ as follows:

$$E' = \int \Omega \left| I(x, y) - \sum_{n=1}^{M} \psi S_n(x, y) \cdot v(S_n) \right|^2 dxdy$$

Where $S_n$ is a peak with an index n of the multiple meshing,

M is the total number of peaks of the multiple meshing,

I(x,y) represents the luminance value (and respectively the chrominance value U or V) of the pixel having coordinates (x, y) of the image to be encoded.

$\psi S_n$ is the interpolation function associated with the peak $S_n$, $v(S_n)$ is the optimized luminance value (and chrominance value respectively) associated with the peak $S_n$.

If the expression is differentiated, we obtain the optimized values by resolving the following linear system of M equations:

$$\begin{cases} \sum_{n=1}^{M} \left( \int_\Omega \psi_{S_l}(x, y) \cdot \psi_{S_n}(x, y) \cdot dxdy \right) \cdot v(S_l) = \int_\Omega I(x, y) \cdot \psi_{S_l}(x, y) \cdot dxdy \\ \sum_{n=1}^{M} \left( \int_\Omega \psi_{S_m}(x, y) \cdot \psi_{S_n}(x, y) \cdot dxdy \right) \cdot v(S_m) = \int_\Omega I(x, y) \cdot \psi_{S_m}(x, y) \cdot dxdy \end{cases}$$

Through the compact base formed by the functions $\psi S_m$, this system of equations can also be expressed as follows:

$$\begin{cases} \sum_{e \in supp(S_l)} \sum_{(x,y) \in S_k} \sum_{ever(e)} \psi_{S_l}(x, y) \cdot \psi_{S_k}(x, y) \cdot v(S_l) = \sum_{e \in supp(S_l)} \sum_{(x,y) \in e} I(x, y) \cdot \psi_{S_l}(x, y) \\ \sum_{e \in supp(S_m)} \sum_{(x,y) \in S_k} \sum_{ever(e)} \psi_{S_m}(x, y) \cdot \psi_{S_k}(x, y) \cdot v(S_m) = \sum_{e \in supp(S_m)} \sum_{(x,y) \in e} I(x, y) \cdot \psi_{S_m}(x, y) \end{cases} \quad (i)$$

Where:
supp ($S_m$) designates the triangles or mesh units whose vertex or peak is the peak $S_m$, and
ver(e) designates the vertices of the triangle e.

Resolving the above system of equations is equivalent to resolving a matrix system of the following type:

AX=B

Where:

A is a symmetric positive-definite matrix.

X is a column matrix of the optimized values $v(S_m)$ with m∈[L.M], and

B is a column matrix of the values of the right-hand term of the system (1).

Since the matrix A is a symmetric positive-definite matrix, it has a unique factorization $A=LDL^T$, L designating a lower triangular matrix with unity diagonal and D being a diagonal matrix for which all the diagonal coefficients are strictly positive. The conditioning of the matrix A is furthermore in the neighborhood of the unity value.

The coefficients of L and D can be determined by identifying the coefficients located in the lower triangle part of the matrices.

$$A_{i,j} = \sum_{k=1,M} L_{i,k} * D_k * L_{j,k} = \sum_{k=1,j} L_{i,k} * D_k * L_{j,k} \text{ for } j \le i$$

Besides, we have:

$$L_{i,j} = \left( A_{i,j} - \left( \sum_{k=1,j-1} L_{i,k} * D_k * L_{j,k} \right) \middle/ D_j \right) \text{ for } l \le j \le i$$

$$D_{i,j} = A_{i,j} - \sum_{k=1,i-1} L_{i,k}^2 * D_k$$

The terms of the matrix X of the optimized values are then determined by the formula:

$$X_i = B_i - \sum_{j=1,i-1} X_j * L_{i,j}$$

According to an improved embodiment, it can be planned to use the profile technique to resolve the system AX=B so as to limit the memory size during the factorization of A. The profile technique replaces the standard representation of a matrix in the form of an M X M table by a representation in the form of two vectors. Indeed, since the matrix A is hollow (it has a large number of zeros), its representation in classic form is inadequate.

APPDENIX 3

This diagonal inversion operation pertains only to the convex quadrilaterlas. FIG. 6A. illustrates an exemplary non-convex quadrilateral for which the diagonal inversion operation is not authorized.

The diagonal inversion operation on a convex quadrilateral Q formed by two triangles T1 and T2 is shown in FIG. 6B. This operation inverts the diagonal representing the edge common to the two triangles T1 nd T2. The quadrilateral Q then comprises, after inversion, two new triangles T'1 and T'2.

The operation for optimizing the topology then comprises the following steps:

computing the divergence in luminance E on each convex quadrilateral Q formed by two adjacent triangles T1, T2 at the highest meshing level, this divergence in luminance being equal to the sum of the sums of the luminance divergence of T1 and T2, E(Q)=E(T1)+E(T2), inverting the diagonal representing the edge common to the two triangles T1 and T2, so as to form two new triangles T'1 and T'2, computing the luminance divergence of the new triangle T'1 and T'2 and adding these value E(Q)=E(T'1)+E(T'2), and keeping, in the meshing, the two triangles for which the sum of the luminance divergence values is the lowest.

What is claimed is:

1. Image encoding method comprising the following steps:
   the definition of a hierarchical meshing having at least two nested meshing levels formed by mesh units defined by peaks (which may be pixels of said image to be encoded)
   the determining, for each of said mesh units, of a piece of error information between said image to be encoded and an interpolated image obtained from the peaks of the mesh units belonging to the meshing level of the mesh units considered;
   putting a stop (33) to the refining of the mesh units having a piece of error information below a predetermined first threshold;
   the implementation of a specific encoding (35) for the mesh units having a piece of error information above a second predetermined threshold;
   the continuation (34) of the refining of the mesh units having a piece of error information above said first predetermined threshold and below said second predetermined threshold.

2. Encoding method according to claim 1, characterized in that said specific encoding implements at least one reversible transformation (72, 74).

3. Encoding method according to claim 1, characterized in that said mesh units are triangles (81).

4. Encoding method according to claim 2, characterized in that said specific encoding comprises the following steps:
   the association, with each of said triangles (81) to be encoded, of a square matrix (84) representing said triangles to be encoded, by means of a first reversible transformation (72);
   the application of a second reversible decorrelation transformation (74) to each of said square matrices (84) delivering transformed matrices.

5. Encoding method according to claim 4, characterized in that said step of associating a square matrix comprises the following steps:
   the affine transformation (82) of a source triangle (81) into an isosceles rectangular triangle (83) called a reference triangle;
   the creation (86) of a square matrix (84) whose lower part includes data representing said isosceles rectangular triangle;
   the symmetrizing (85) of said square matrix.

6. Encoding method according to claim 2, characterized in that said second transformation (74) belongs to the group comprising:
the Karhunen Loeve transformation (KLT),
the discrete Fourier transformation (DFT),
the discrete cosine transfomration (DCT),
and the Walsh Hadamard transformation (WHT).

7. Encoding method according to claim 1, characterized in that said specific encoding comprises a step of quantification (75) and of encoding the data of the lower part of said transformed matrix.

8. Encoding method according to claim 1, wherein at least at least one of the following parameters can be modified:
said first threshold;
said second threshold;
the structure of said nested meshing;
a scaling factor α enabling an expansion or compression of said square matrix in the space domain;
the type of qualification;
the quantification pitch.

9. Encoding method according to claim 1, characterized in that said piece of error information corresponds to a difference in luminance, representing a squared error or an absolute error between a source triangle and the corresponding approximate angle.

10. Encoding method according to claim 1, characterized in that, for each mesh unit, the following choice is made:
if said piece of error information is below said first threshold, the hierarchical division for the mesh unit considered is interrupted (132);
if said piece of error information is above said first threshold, but below said second threshold, the application of said hierarchical division (134) is continued;
if said difference in luminance is above said second threshold, said specific encoding (135) is implemented.

11. Encoding method according to claim 1, characterized in that, for all meshing levels other than the first level, the data taken into account for the encoding are quantified differential values, each corresponding to the quantified difference between an optimized value for the hierarchical level considered of the image to be encoded and a value interpolated from the meshing of the lower hierarchical level.

12. Encoding method according to claim 1, comprising a step for optimizing the position of the peaks of each of said meshings, minimizing a predetermined error criterion.

13. Encoding method according to claim 1, comprising a step for defining a quaternary subdivision tree used to identify the mesh units using said specific encoding and the mesh units whose contents are interpolated from the values at the nodes defining said mesh units.

14. Encoding method according to claim 1, comprising a step for matching said mesh units with the contents of the image, implementing inversions of diagonals of the quadrilaterals formed by all the pairs of adjacent triangles.

15. A method for the decoding of an image encoded according to an encoding method comprising the following steps:
the definition of a hierarchical meshing having at least two nested meshing levels formed by mesh units defined by peaks;
the determining, for each of said mesh units, of a piece of error information between said image to be encoded and an interpolated image obtained from the peaks of the mesh units belonging to the meshing level of the mesh units considered;
putting a stop to the refining of the mesh units having a piece of error information below a predetermined first threshold;
the implementation of a specific encoding for the mesh units having a piece of error information above a second predetermined threshold;
the continuation of the refining of the mesh units having a piece of error information above said first predetermined threshold and below said second predetermined threshold;
characterized in that it comprises the following steps:
the preliminary decoding of said data encoded according to said encoding, implementing a hierarchical meshing, enabling the description of an initial representation;
the complementary decoding of said data encoded by means of said specific encoding, enabling the refining of said initial representation.

16. Decoding method according to claim 15, characterized in that said complementary decoding step is optional.

17. Decoding method according to claim 15, characterized in that said specific encoding comprises the following steps:
the association, with each of said source triangles to be processed, of a square matrix representing said source triangle, by means of a first reversible transformation;
the application of a second reversible decorrelation transformation to each of said square matrices delivering transformed matrices, characterized in that said complementary decoding advantageously comprises the following steps of reconstruction:
a) the application of an inverse transformation to said second reversible transformation on said transformed matrices, delivering said reconstructed square matrices;
b) the association, with each of said reconstructed square matrices, of a corresponding reconstructed triangle by means of an inverse affine transformation of said first reversible transformation;
c) the reconstruction of said minimum partition from said reconstructed triangle.

18. Decoding method according to claim 17, characterized in that said square matrices are recreated from data of a received bit stream, whose decoded data are the coefficients of the triangle to be reconstructed, which form the lower part of said matrix.

19. Decoding method according to claim 15, characterized in that said preliminary decoding provides for the reading, in the bit stream, of at least one of the pieces of information belonging to the group comprising:
the number of levels of the hierarchy;
the identification of the encoding technique used for each of the triangles;
the succession of the differential values of the components associated with the nodes of the hierarchical meshing;
the identification of the arcs on which a diagonal inversion is made.

* * * * *